US012689860B2

(12) United States Patent
Bilert et al.

(10) Patent No.: US 12,689,860 B2
(45) Date of Patent: Jul. 21, 2026

(54) METHOD FOR OPERATING A HEARING DEVICE, HEARING DEVICE AND COMPUTER PROGRAM PRODUCT

(71) Applicant: Sivantos Pte. Ltd., Singapore (SG)

(72) Inventors: Sascha Bilert, Erlangen (DE); Eghart Fischer, Erlangen (DE); Jens Hain, Erlangen (DE); Homayoun Kamkar-Parsi, Erlangen (DE); Cecil Wilson, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 156 days.

(21) Appl. No.: 18/607,767

(22) Filed: Mar. 18, 2024

(65) Prior Publication Data

US 2024/0314501 A1 Sep. 19, 2024

(30) Foreign Application Priority Data

Mar. 16, 2023 (DE) ..................... 10 2023 202 367.9

(51) Int. Cl.
*H04R 25/00* (2006.01)

(52) U.S. Cl.
CPC .................................... *H04R 25/30* (2013.01)

(58) Field of Classification Search
CPC ................................ H04R 25/00; H04R 25/30
See application file for complete search history.

(56) References Cited

U.S. PATENT DOCUMENTS

| | | |
|---|---|---|
| 10,403,306 B2 | 9/2019 | Kamkar Parsi et al. |
| 11,223,916 B2 | 1/2022 | Kamkar-Parsi et al. |

(Continued)

FOREIGN PATENT DOCUMENTS

| | | |
|---|---|---|
| CN | 114724571 A | 7/2022 |
| DE | 102019214220 A1 | 3/2021 |

(Continued)

OTHER PUBLICATIONS

May, Tobias et al.: Assessment of broadband SNR estimation for hearing aid applications. In: 2017 IEEE International Conference on Acoustics, Speech, and Signal Processing; Proceedings. Mar. 5-9, 2017, New Orleans. Piscataway : IEEE, 2017. S. 231-235. ISBN 978-1-5090-4117-6. DOI: 10.1109/ICASSP.2017.7952152.

(Continued)

*Primary Examiner* — Suhan Ni

(74) *Attorney, Agent, or Firm* — Laurence A. Greenberg; Werner H. Stemer; Ralph E. Locher

(57) ABSTRACT

A method for operating a hearing device having an input transducer, a signal processing device and an output transducer includes using the input transducer to generate an input signal. The signal processing device has a quality checking unit used to take the input signal as a basis for determining a measure of a signal quality. The quality checking unit is configured for two operating modes, specifically a first operating mode and a second operating mode. The signal processing device has an own voice checking unit used to take the input signal as a basis for determining an activity of an own voice. The quality checking unit is operated in the first operating mode if no activity of an own voice is determined and in the second operating mode if an activity of the own voice is determined. A hearing device and a computer program product perform the method.

10 Claims, 1 Drawing Sheet

(56) References Cited

U.S. PATENT DOCUMENTS

| | | | | |
|---|---|---|---|---|
| 2014/0321682 | A1* | 10/2014 | Kofod-Hansen ...... | H04R 25/30 381/315 |
| 2014/0369537 | A1* | 12/2014 | Pontoppidan ........ | H04R 25/606 381/314 |
| 2015/0163602 | A1* | 6/2015 | Pedersen .............. | H04R 25/554 381/315 |
| 2016/0057547 | A1* | 2/2016 | Bürger ................... | H04R 25/00 381/315 |

FOREIGN PATENT DOCUMENTS

| | | | |
|---|---|---|---|
| EP | 3252766 | A1 | 12/2017 |
| EP | 3222057 | B1 | 5/2019 |
| EP | 3694229 | A1 | 8/2020 |

OTHER PUBLICATIONS

Dillon, Harvey: Hearing aids. Second edition. Turramurra: Boomerang Press, 2012. S. 228-229. -ISBN 978-1-60406-810-8.

Jurgen Tchorz et al, "SNR Estimation Based on Amplitude Modulation Analysis With Applications to Noise Suppression", IEEE Transactions on Speech and Audio Processing, Mai 2003 , pp. 184-192, vol. 11, No. 3, URL:https://ieeexplore.ieee.org/document/1208288.

* cited by examiner

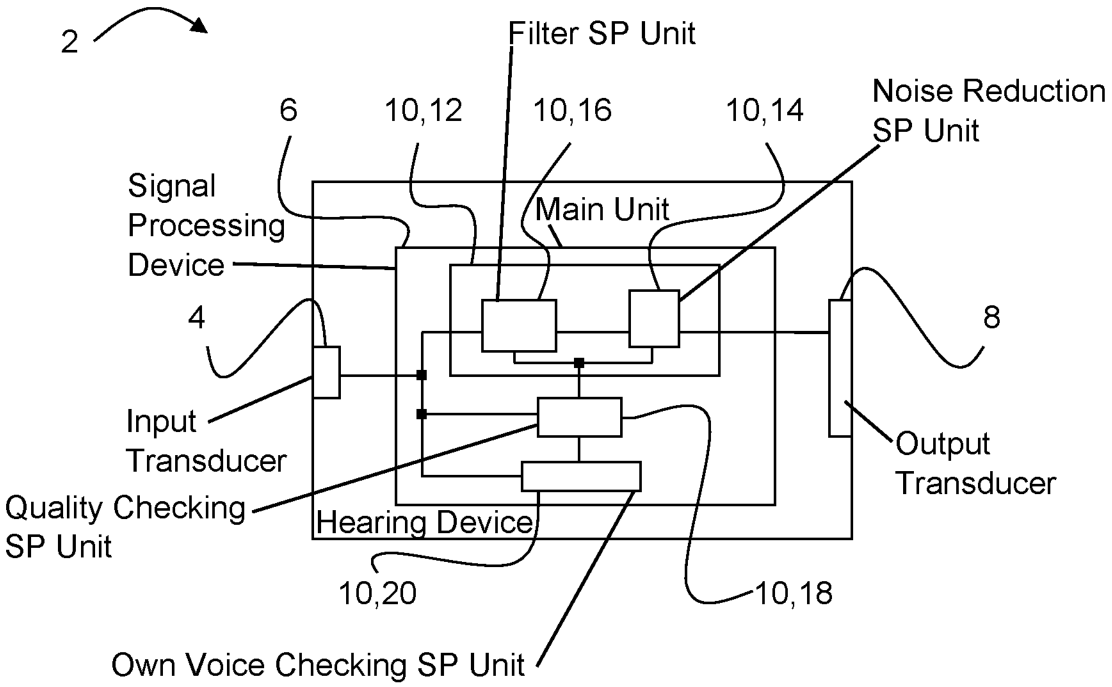
2
Filter SP Unit
6
10,12
10,16
10,14
Noise Reduction
SP Unit
Signal
Processing
Device
Main Unit
4
8
Input
Transducer
Output
Transducer
Quality Checking
SP Unit
Hearing Device
10,20
10,18
Own Voice Checking SP Unit

METHOD FOR OPERATING A HEARING DEVICE, HEARING DEVICE AND COMPUTER PROGRAM PRODUCT

CROSS-REFERENCE TO RELATED APPLICATION

This application claims the priority, under 35 U.S.C. § 119, of German Patent Application DE 10 2023 202 367.9, filed Mar. 16, 2023; the prior application is herewith incorporated by reference in its entirety.

FIELD AND BACKGROUND OF THE INVENTION

The invention relates to a method for operating a hearing device having an input transducer, a signal processing device and an output transducer. Additionally, the invention relates to a hearing device and a computer program product.

Hearing devices is the term typically used for conventional hearing aids used to provide support for persons who are hard of hearing. In the broader sense, however, this term also refers to devices that are configured to assist people with normal hearing. Hearing devices for assisting people with normal hearing are also referred to as "Personal Sound Amplification Products" or "Personal Sound Amplification Devices" ("PSAD" for short). In contrast to conventional hearing aids, such hearing devices are not provided to compensate for hearing loss but rather are employed specifically to assist and improve normal human hearing in specific hearing situations, e.g. to assist with animal observation, to be better able to hear animal sounds and other noises produced by animals, to assist hunters in hunting, for sports reporters, to facilitate improved speaking and/or speech comprehension in complex soundscapes, for musicians, to reduce hearing strain, etc.

Irrespective of the intended use, hearing devices normally include at least one input transducer, a signal processing device and an output transducer as important components. The at least one input transducer is generally formed by an acoustoelectric transducer, that is to say for example by a microphone, or by an electromagnetic receiver, for example an induction coil. In many cases, multiple input transducers are installed, that is to say for example one or more acoustoelectric transducers and an electromagnetic receiver. The output transducer normally used is an electroacoustic transducer, for example a miniature loudspeaker (also referred to as a "receiver"), or an electromechanical transducer, for example a bone conduction receiver. The signal processing device is generally realized by an electronic circuit realized on a printed circuit board and, irrespective of this, normally has an amplifier.

SUMMARY OF THE INVENTION

It is accordingly an object of the invention to provide a method for operating a hearing device, a hearing device and a computer program product, which overcome the hereinafore-mentioned disadvantages of the heretofore-known methods, devices and computer program products of this general type.

With the foregoing and other objects in view there is provided, in accordance with the invention, a method for operating a hearing device having an input transducer, a signal processing device and an output transducer, the method comprising using the input transducer to generate an input signal, providing the signal processing device with a quality checking unit, the quality checking unit is used to take the input signal as a basis for determining a measure of a signal quality, the quality checking unit is configured for two operating modes, specifically a first operating mode and a second operating mode, the signal processing device has an own voice checking unit, the own voice checking unit is used to take the input signal as a basis for determining an activity of an own voice, and the quality checking unit is operated in the first operating mode if no activity of an own voice is determined and in the second operating mode if an activity of the own voice is determined.

With the objects of the invention in view, there is also provided a hearing device configured to perform a method according to the invention in at least one operating mode.

Preferred developments are included in the dependent claims. The advantages and preferred configurations listed with regard to the method are also transferable, mutatis mutandis, to the hearing device, and vice versa. Additionally, the advantages and preferred configurations listed with regard to the method are also transferable, mutatis mutandis, to a computer program product, and vice versa.

The method according to the invention is used for operating a hearing device according to the invention, in particular a digital hearing device. Conversely, a hearing device according to the invention is configured in such a way that it can be used to perform the method according to the invention. The hearing device is typically configured in the style of a hearing device as described at the outset. It includes an input transducer, a signal processing device and an output transducer.

The input transducer is used to generate an electrical input signal, called an input signal hereinbelow for short, based on an acoustic input signal that hits the (input side of the) hearing device. To this end, the input transducer conveniently has an acoustoelectric transducer, that is to say in particular at least one microphone, and preferably an analog/digital converter.

The input signal generated by the input transducer is then typically processed in the signal processing device, the input signal conveniently being taken as a basis for generating an output signal, that is to say an electrical output signal. The output transducer then typically takes the output signal, that is to say the electrical output signal, as a basis for generating an acoustic output signal and delivering it from (the output side of) the hearing device, specifically in particular into an auditory canal of a hearing device wearer. In this case, the output transducer preferably has a digital/analog converter and an electroacoustic transducer, for example a loudspeaker.

The signal processing device is furthermore configured to form a number of units, also called SP units hereinbelow. The applicable units, that is to say SP units, are typically formed by signal processing modules or data processing modules, that is to say for example by software program modules.

The method according to the invention is thus used to operate a hearing device that includes the input transducer, the signal processing device and the output transducer. The signal processing device in this instance has a quality checking unit and an own voice checking unit as SP units. The quality checking unit is configured for two operating modes, specifically a first operating mode and a second operating mode.

During performance of the method, the input transducer is now used to generate the input signal. Further, the quality checking unit is used to take the input signal as a basis for determining a measure of a signal quality and the own voice checking unit is used to take the input signal as a basis for determining an activity of an own voice. The signal processing device is then furthermore configured in such a way that the quality checking unit is operated in the first operating mode if no activity of an own voice is determined and in the second operating mode when an activity of the own voice is determined.

The signal processing device is therefore then configured in particular in such a way that the quality checking unit is controlled by the own voice checking unit, specifically at least insofar as changes between the first operating mode and the second operating mode are triggered by the own voice checking unit.

The own voice checking unit in this instance is configured for so-called own voice detection (OVD). Own voice detection methods are known in principle. An example thereof is described in more detail in European Patent EP 3 222 057 B1, corresponding to U.S. Pat. No. 10,403,306. The own voice checking unit is now typically configured to implement an inherently known own voice detection method, in particular the method according to European Patent EP 3 222 057 B1, corresponding to U.S. Pat. No. 10,403,306, and to take this as a basis for determining whether an activity of an own voice is present or whether no activity of the own voice is present.

Further, the measure of the signal quality that is determined by the quality checking unit is conveniently a time-dependent measure and in particular a time-dependent value.

Depending on the application, the signal processing device is furthermore configured in such a way that the measure of the signal quality is determined only in the first operating mode and that determination pauses in the second operating mode. In an advantageous development, the current measure or current value of the signal quality that is then assumed for the duration of the second operating mode is the most recently determined measure or the most recently determined value determined before the change from the first operating mode to the second operating mode. In this case, the measure or value is then effectively frozen until the next determination, that is to say until the next change to the first operating mode.

Alternatively, the measure of the signal quality is determined by a first algorithm in the first operating mode and by a second algorithm in the second operating mode.

It is also advantageous if the own voice checking unit is used to generate a binary information signal and if the change between the first operating mode and the second operating mode is controlled by the binary information signal.

Additionally, preference is given to a variant of the method according to the invention in which the measure of the signal quality that is determined is a signal/noise ratio or signal-to-noise ratio. Suitable methods for determining such a signal/noise ratio (SNR) are known in principle. A corresponding method is described for example in German Patent Application DE 10 2019 214 220 A1, corresponding to U.S. Pat. No. 11,223,916. According to a variant of the method according to the invention, that method is part of the method according to the invention. That is to say that the quality checking unit is preferably configured to implement an inherently known method for determining such a signal/noise ratio (SNR), in particular the method according to European Patent EP 3 222 057 B1, corresponding to U.S. Pat. No. 10,403,306, and therefore to determine a signal/noise ratio as a measure of the signal quality.

It is also convenient if the signal processing device has a main unit as an SP unit, the main unit being used to take the input signal as a basis for generating the output signal for the output transducer. Preferably, further, the output signal is then generated on the basis of the measure of the signal quality.

Moreover, a method variant in which an SP unit of the signal processing device, specifically a noise reduction unit, is used to realize a noise reduction and in which the measure of the signal quality is taken as a basis for varying the strength of the noise reduction is advantageous. Depending on the application, the noise reduction unit is integrated in the main unit or assigned to the main unit, for example.

Additionally, a method variant in which the signal processing device has, as an SP unit, a filter unit containing at least one filter for spatial separation is advantageous. Preferably, the measure of the signal quality is then taken as a basis for varying at least one filter parameter of the at least one filter. Depending on the application, the filter unit is integrated in the main unit or assigned to the main unit, for example.

The previously described method according to the invention is used, as already explained previously, to operate a hearing device according to the invention and is accordingly configured therefor. Conversely, the hearing device according to the invention is configured to perform the method according to the invention in at least one operating mode. For this purpose, the hearing device has in particular the signal processing device described previously. The signal processing device is then preferably used to perform the method, to which end an executable program is more preferably stored or installed in the signal processing device that, after being launched, automatically performs the method.

With the objects of the invention in view, there is concomitantly provided a computer program product on which a corresponding program can also be installed or stored subsequently. That computer program product is typically a file or data carrier with a file, the file containing the executable program, that is to say in particular a suitable program code.

Other features which are considered as characteristic for the invention are set forth in the appended claims.

Although the invention is illustrated and described herein as embodied in a method for operating a hearing device, a hearing device and a computer program product, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURE

The FIGURE of the drawing is a block diagram showing a hearing device.

DETAILED DESCRIPTION OF THE INVENTION

Referring now in detail to the single FIGURE of the drawing, there is seen a hearing device 2 that is described by way of example hereinbelow, outlined in the FIGURE and includes an input transducer 4, a signal processing device 6 and an output transducer 8.

The input transducer 4 in this instance is used to generate an electrical input signal, called an input signal hereinbelow for short, on the basis of an acoustic input signal that hits the hearing device 2. For this purpose, the input transducer 4 conveniently has a microphone and preferably an analog/digital converter.

The input signal generated by the input transducer 4 is then processed in the signal processing device 6, the input signal being taken as a basis for generating an output signal, that is to say an electrical output signal. The output transducer 8 then takes the output signal, that is to say the electrical output signal, as a basis for generating an acoustic output signal and delivering it from the hearing device 2. In this instance, the output transducer preferably has a digital/analog converter and an electroacoustic transducer, for example a loudspeaker.

The signal processing device is furthermore configured to form a number of units, called SP units 10 hereinbelow. The applicable SP units 10 are preferably formed by software program modules.

One of these SP units 10 that the signal processing device 6 forms is a main unit 12. This main unit 12 is used to generate the output signal for the output transducer 8 and in particular to realize the amplification of acoustic signals that is typical of hearing devices 2.

In the exemplary embodiment, the main unit 12 incorporates an SP unit 10 that is used to realize a noise reduction, specifically a noise reduction unit 14. This noise reduction unit 14 is configured to vary the strength of the noise reduction on the basis of a measure of a signal quality of the input signal.

Another SP unit 10 that the main unit 12 incorporates is a filter unit 16 containing at least one filter for spatial separation. This filter unit is configured in such a way that the measure of the signal quality is taken as a basis for varying at least one filter parameter of the at least one filter.

The measure of the signal quality, that is to say the measure of the signal quality of the input signal, is determined by another SP unit 10, specifically a quality checking unit 18. The quality checking unit 18 is configured for two operating modes, specifically a first operating mode and a second operating mode.

In the exemplary embodiment, the measure of the signal quality that is determined on the basis of the input signal is a signal/noise ratio, which is then available in the form of a time-dependent value. A current value is determined only in the first operating mode, and determination pauses in the second operating mode. Therefore, the current value for the signal/noise ratio that is then assumed for the duration of the second operating mode is the most recently determined value determined before the change from the first operating mode to the second operating mode. In this case, the value is then effectively frozen until the next determination, that is to say until the next change to the first operating mode.

Another SP unit 10 that the signal processing device 6 forms is an own voice checking unit 20. The own voice checking unit 20 in this instance is configured for so-called own voice detection (OVD) on the basis of the input signal. Own voice detection methods are known in principle. The own voice checking unit 20 is now typically configured to implement an inherently known own voice detection method and to take this as a basis for determining whether an activity of an own voice is present or whether no activity of the own voice is present.

The signal processing device 6 is now furthermore configured in such a way that the quality checking unit 18 is controlled by the own voice checking unit 20, specifically at least insofar as changes between the first operating mode and the second operating mode of the quality checking unit 18 are triggered by the own voice checking unit 20. As a result, the quality checking unit 18 is operated in the first operating mode if the own voice checking unit 20 determines no activity of an own voice and in the second operating mode if the own voice checking unit 20 determines an activity of the own voice.

The following is a summary list of reference numerals and the corresponding structure used in the above description of the invention.

LIST OF REFERENCE SIGNS

2 hearing device
4 input transducer
6 signal processing device
8 output transducer
10 SP unit
12 main unit
14 noise reduction unit
16 filter unit
18 quality checking unit
20 own voice checking unit

The invention claimed is:

1. A method for operating a hearing device having an input transducer, a signal processing device and an output transducer, the method comprising:
- using the input transducer to generate an input signal;
- providing the signal processing device with a quality checking unit;
- using the quality checking unit to determine a measure of a signal quality based on the input signal;
- configuring the quality checking unit for a first operating mode and a second operating mode;
- determining the measure of the signal quality only in the first operating mode and pausing determination of the measure of the signal quality in the second operating mode;
- providing the signal processing device with an own voice checking unit;
- using the own voice checking unit to determine an activity of an own voice based on the input signal; and
- operating the quality checking unit in the first operating mode when no activity of an own voice is determined and in the second operating mode when an activity of the own voice is determined.

2. The method according to claim 1, which further comprises determining the measure of the signal quality by using a first algorithm in the first operating mode and determining the measure of the signal quality by using a second algorithm in the second operating mode.

3. The method according to claim 1, which further comprises using the own voice checking unit to generate a binary information signal and using the binary information signal to control a change between the first operating mode and the second operating mode.

4. The method according to claim 1, which further comprises determining the measure of the signal quality as a signal/noise ratio.

5. The method according to claim 1, which further comprises:
- providing the signal processing device with a main unit;

using the main unit to take the input signal as a basis for generating an output signal for the output transducer; and generating the output signal based on the measure of the signal quality.

6. The method according to claim 5, which further comprises using the main unit to realize a noise reduction and taking the measure of the signal quality as a basis for varying a strength of the noise reduction.

7. The method according to claim 5, which further comprises providing the main unit with a filter unit containing a filter for spatial separation and taking the measure of the signal quality as a basis for varying a filter parameter of the filter.

8. A hearing device configured to perform the method according to claim 1 in at least one operating mode.

9. A non-transitory computer program product containing a computer program that can be executed on a signal processing device of a hearing device and that, after being launched, automatically performs the method according to claim 1.

10. The method according to claim 1, which further comprises:

providing the signal processing device with a main unit;

using the main unit to take the input signal as a basis for generating an output signal for the output transducer;

generating the output signal based on the measure of the signal quality; and a current measure or a current value of the signal quality then being assumed for a duration of the second operating mode being a most recently determined measure or a most recently determined value determined before a change from the first operating mode to the second operating mode, causing the measure or value to then be effectively frozen until a next determination, which is until a next change to the first operating mode.

* * * * *